United States Patent
Cheng et al.

(10) Patent No.: US 9,692,464 B1
(45) Date of Patent: Jun. 27, 2017

(54) SIGNAL TRANSMITTER CAPABLE OF REDUCING NOISE

(71) Applicant: RichWave Technology Corp., Taipei (TW)

(72) Inventors: Ting-Yuan Cheng, Taipei (TW); Da-Cheng Peng, Taipei (TW); Zhuo Fu, Taipei (TW); Hwey-Ching Chien, Taipei (TW)

(73) Assignee: RichWave Technology Corp., Taipei (TW)

( * ) Notice: Subject to any disclaimer, the term of this patent is extended or adjusted under 35 U.S.C. 154(b) by 0 days.

(21) Appl. No.: 15/164,830

(22) Filed: May 25, 2016

(30) Foreign Application Priority Data

Jan. 29, 2016 (TW) .............................. 105102781 A

(51) Int. Cl.
  *H04L 25/03* (2006.01)
  *H04B 1/04* (2006.01)
  *H04L 27/20* (2006.01)
  *H04L 27/152* (2006.01)

(52) U.S. Cl.
  CPC ......... *H04B 1/0475* (2013.01); *H04L 27/152* (2013.01); *H04L 27/20* (2013.01)

(58) Field of Classification Search
  CPC ..... H03L 7/193; H03L 7/1075; H03L 7/1077; H03D 1/2281; H03C 3/095; H03C 3/0933; H03C 3/0925; H03C 3/0958; H03C 3/0975; H03C 3/0966; H03C 3/0908; H03C 3/09

USPC ........ 375/295–297, 327, 376; 455/114.3, 86; 327/156, 159, 127
  See application file for complete search history.

(56) References Cited

U.S. PATENT DOCUMENTS

| | | | | |
|---|---|---|---|---|
| 6,766,158 | B1 * | 7/2004 | Molnar ................. | H03D 7/163 331/46 |
| 7,295,077 | B2 * | 11/2007 | Thomsen .............. | H03L 7/0898 327/105 |
| 7,738,851 | B2 * | 6/2010 | Cooley .................... | H03D 7/14 329/325 |
| 8,412,116 | B1 * | 4/2013 | Kim ........................ | H04B 1/38 375/219 |
| 2003/0078013 | A1 * | 4/2003 | Ferguson, Jr. ........ | H03L 7/1976 455/85 |
| 2006/0119437 | A1 * | 6/2006 | Thomsen ................ | H03L 1/022 331/10 |
| 2010/0097150 | A1 * | 4/2010 | Ueda ....................... | H03L 7/089 331/25 |
| 2010/0220778 | A1 * | 9/2010 | Fuse ........................ | H03D 7/00 375/226 |
| 2011/0255628 | A1 * | 10/2011 | Woleben .............. | H04B 1/0475 375/285 |
| 2012/0049913 | A1 * | 3/2012 | Tadjpour ................ | H03L 7/104 327/157 |

* cited by examiner

*Primary Examiner* — Khanh C Tran
(74) *Attorney, Agent, or Firm* — Winston Hsu

(57) ABSTRACT

A signal transmitter includes a modulation circuit, a signal separation circuit, and a signal combining circuit. The modulation circuit modulates a first signal to a modulated signal. The signal separation circuit separates the modulated signal into N separated signals. The N separated signals have different phases. The signal combining circuit combines the N separated signals to eliminate at least one order of harmonic signals of the N separated signals so as to generate an output signal.

21 Claims, 15 Drawing Sheets

SIGNAL TRANSMITTER CAPABLE OF REDUCING NOISE

CROSS REFERENCE TO RELATED APPLICATION

This application claims priority of Taiwan application No. 105102781, which was filed on Jan. 29, 2016, and is included herein by reference.

TECHNICAL FIELD

This invention is related to a signal transmitter, and more particularly, a signal transmitter that is able to reduce noise.

BACKGROUND

Generally, a signal transmitter may mix a data signal with a reference oscillation signal to generate a high frequency output signal. However, when generating the output signal, if the frequency of the output signal is close to the frequency of the reference oscillation signal, these two signals may interfere with each other, which may produce noise to the output signal and lower the quality of communications. To solve this issue, the signal transmitter may further mix the output signal with another reference oscillation signal so that the frequency of the final output signal would be the sum of the frequencies of the two reference oscillation signals, and the output signal will not be interfered by the reference oscillation signals.

However, this approach requires not only extra mixture elements, but also extra filters to reduce the harmonic signals of the output signal. In this case, the circuit area and the power consumption of the signal transmitter would be increased. Therefore, how to reduce the circuit area and the power consumption of the signal transmitter while reducing the noise of the output signal has become an issue to be solved.

SUMMARY

One embodiment of the present invention discloses a signal transmitter. The signal transmitter includes a modulation circuit, a signal separation circuit, and a signal combining circuit. The modulation circuit is for modulating a first signal to a modulated signal. The signal separation circuit is coupled to the modulation circuit and is for separating the modulated signal into N separated signals. N is a positive integer greater than 1, and the N separated signals have different phases. The signal combining circuit is coupled to the signal separation circuit and is for combining the N separated signals to eliminate at least one harmonic signal of the N separated signals so as to generate an output signal.

Another embodiment of the present invention includes a signal transmitter. The signal transmitter discloses a phase lock loop, and an analog to digital converter. The phase lock loop is for generating a modulated signal at least according to a first signal. The analog to digital converter is coupled to the phase lock loop and is for converting an analog signal to the first signal with the first signal being a digital signal. The phase lock loop includes a multi-modulus divider. The multi-modulus divider generates a first clock signal required by the phase lock loop for modulating the first signal and generates a second clock signal required by the analog to digital converter.

DETAILED DESCRIPTION

Figure 1:
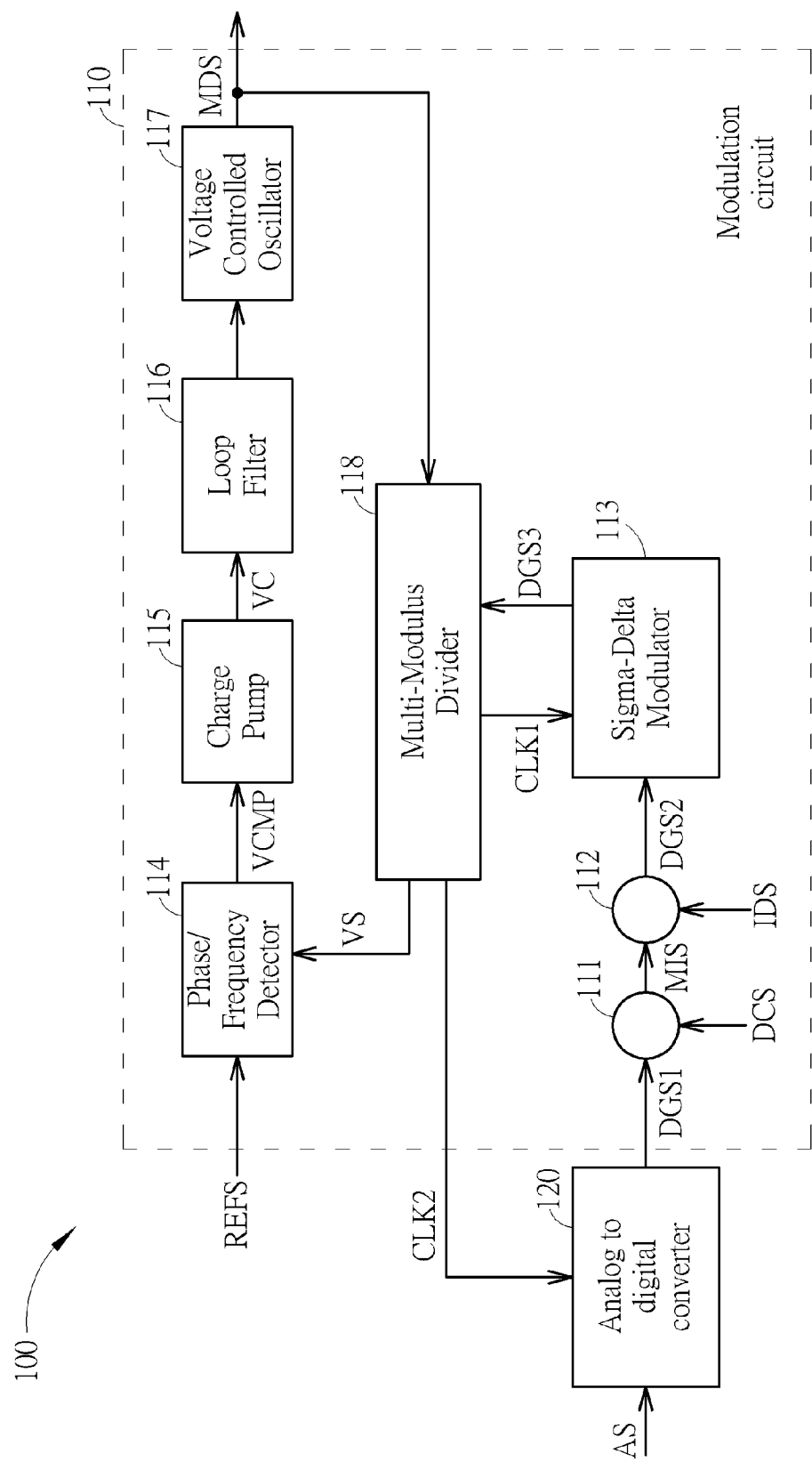
FIG. 1 shows a signal transmitter according to one embodiment of the present invention.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 shows a signal transmitter 100 according to one embodiment of the present invention. The signal transmitter 100 includes an analog to digital converter 120 and a modulation circuit 110. In FIG. 1, the modulation circuit 110 can be a phase lock loop. However, in some embodiments, the modulation circuit 110 can also be a frequency lock loop.

The analog to digital converter 120 is coupled to the modulation circuit 110, the analog to digital converter 120 may convert an analog signal AS to a first signal DGS1, and the modulation circuit 110 can generate the modulated signal MDS according to the first signal DGS1.

In FIG. 1, the modulation circuit 110 includes a first mixture element 111, a second mixture element 112, a sigma-delta modulator 113, a phase/frequency detector 114, a charge pump 115, a loop filter 116, a voltage controlled oscillator 117, and a multi-modulus divider 118.

The first mixture element 111 is coupled to the analog to digital converter 120, and can mix a digital control signal DCS inputted externally and the first signal DGS1 to generate a mixed input signal MIS. The first signal DGS1 can be a digital signal. The second mixture element 112 can mix the mixed input signal MIS and a modulation reference signal IDS of the signal transmitter 100 to generate a second signal DGS2. In some embodiments, the first mixture element 111 can be an adder, the second mixture element 112 can be a multiplier, the digital control signal DCS can be a tone signal, and the modulation reference signal IDS can be used as a modulation index. In some embodiments, the first mixture element 111 and the second mixture element 112 may also be removed according to the system requirement, or may be implemented by mixers, multipliers or adders.

Furthermore, the first mixture element 111 can mix the first signal DGS1 containing the data to be transmitted with the digital control signal DCS for controlling the receiver. However, in some embodiments, this function may not be required so the phase lock loop of the modulation circuit 110 may not include the first mixture element 111. In this case, the second mixture element 112 may mix the first signal DGS1 and the modulation reference signal IDS to generate the second signal DGS2.

The sigma-delta modulator 113 can modulate the second signal DGS2 to a third signal DGS3. The multi-modulus divider 118 can generate the internal oscillation signal VS according to the third signal DGS3 and the modulated signal MDS so as to feedback the internal oscillation signal VS to the phase/frequency detector 114 to maintain the modulated signal MDS at the required frequency and phase. The phase/frequency detector 114 can output a comparing result according to a difference between the internal oscillation signal VS and a reference signal REFS generated from external or internal of the signal transmitter 100. For example, the phase/frequency detector 114 may output a compare voltage VCMP according to the phase difference between the internal oscillation signal VS and the reference signal REFS, and the charge pump 115 can output the control voltage VC according to the compare voltage VCMP. The loop filter 116 can filter the high frequency noise of the control voltage VC, and then, the voltage controlled oscillator 117 can output the modulated signal MDS according to the filtered control voltage VC. In some embodiments, the reference signal REFS has a fixed frequency.

In the aforesaid embodiment, the multi-modulus divider 118 can further generate a clock signal CLK1 required by the sigma-delta modulator 113 and a clock signal CLK2 required by the analog to digital converter 120. Since the clock signals CLK1 and CLK2 are both generated by the multi-modulus divider 118, the phases of these two clock signals can be synchronized with each other so as to reduce noise. That is, the signal transmitter 100 can reduce the noise of the output signal without additional filter or additional circuit area. In some embodiments, the clock signal CLK1 and the clock signal CLK2 are substantially the same.

Figure 2:
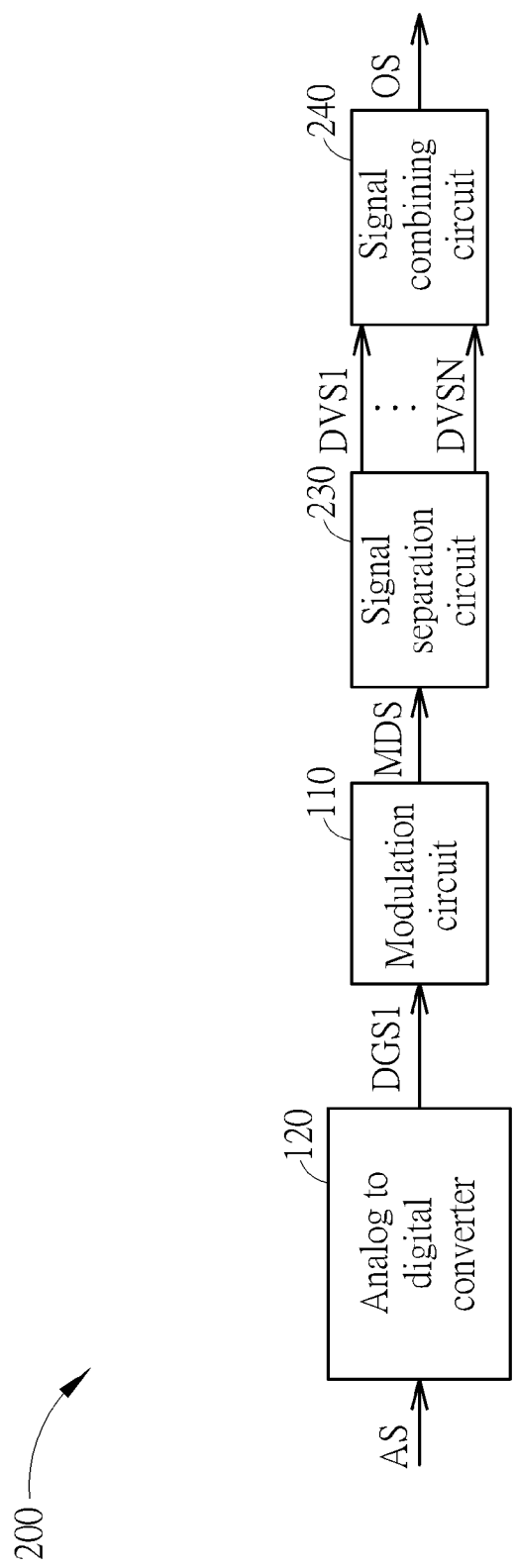
FIG. 2 shows a signal transmitter according to another embodiment of the present invention.

FIG. 2 shows a signal transmitter 200 according to one embodiment of the present invention. The signal transmitter 200 includes the analog to digital converter 120, the modulation circuit 110, a signal separation circuit 230, and a signal combining circuit 240. The signal transmitter 200 and the signal transmitter 100 have similar operation principles. The main difference between these two is in that the signal transmitter 200 is able to further lower the frequency of the modulation signal MDS by the signal separation circuit 230, and is able to remove unnecessary harmonic signals for reducing noise by the signal combining circuit 240.

In the present embodiment, the signal separation circuit 230 can be a frequency divider, the frequency divider can be coupled to the modulation circuit 110, and can divide the frequency of the modulated signal MDS to generate N separated signals DVS1 to DVSN. The N separated signals DVS1 to DVSN have different phases but the same frequency. In some embodiments, the amplitudes of the N separated signals DVS1 to DVSN can be substantially the same. The signal combining circuit 240 is coupled to the signal separation circuit 230, and can combine the N separated signals DVS1 to DVSN to eliminate harmonic signals of the N separated signals DVS1 to DVSN so as to generate the output signal OS. The output signal OS will still include the first harmonic signals (or the signals with the fundamental frequency) of the N separated signals DVS1 to DVSN.

Figure 3:
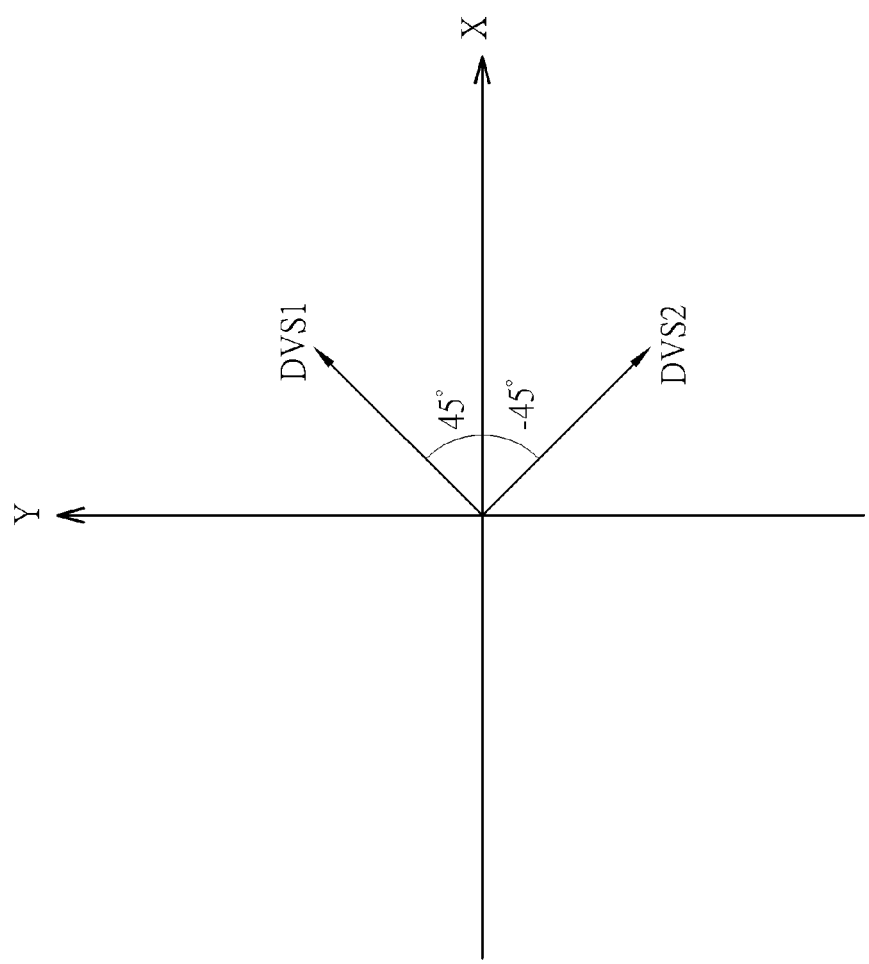
FIG. 3 shows separated signals according to one embodiment of the present invention.
Figure 4:
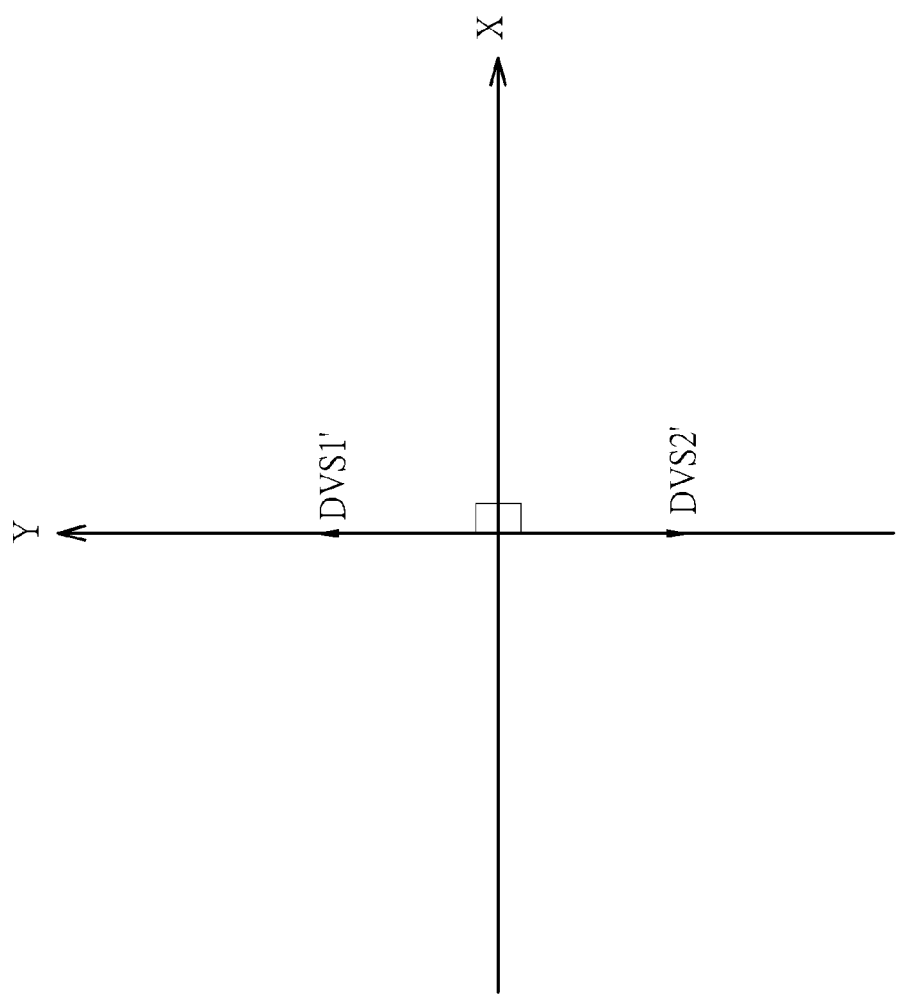
FIG. 4 shows second harmonic signals of the separated signals of FIG. 3.

FIG. 3 shows the separated signals DVS1 and DVS2 according to one embodiment of the present invention. FIG. 4 shows the second harmonic signals DVS1' and DVS2' of the separated signals DVS1 and DVS2. In FIG. 3 and FIG. 4, the separated signals DVS1 and DVS2 and the second harmonic signals DVS1' and DVS2' are represented by vectors. Lengths of the vectors represent the amplitudes of the signals, and angles between the vectors and the X-axis represent the phases of the signals. In FIG. 3, the phase angle of the separated signal DVS1 generated by the signal separation circuit 230 is 45 degrees, and the phase angle of the separated signal DVS2 is −45 degrees. In FIG. 4, the phase angle of the second harmonic signal DVS1' of the separated signal DVS1 will be doubled to be 90 degrees, and the phase angle of the second harmonic signal DVS2' of the separated signal DVS2 will be doubled to be −90 degrees. That is, the phase difference between the two harmonic signals is 180 degrees. In this case, if the signal combining circuit 240 can combine the first separated signal DVS1 and the second separated signal DVS2 with the same weightings, then the amplitudes of the second harmonic signals DVS1' and DVS2' of the separated signals DVS1 and DVS2 would also be the same and the second harmonic signals DVS1' and DVS2' in FIG. 4 would cancel each other. Therefore, the output signal OS will include the separated signals DVS1 and DVS2 in FIG. 3 but will not include the second harmonic signals DVS1' and DVS2' of the separated signals DVS1 and DVS2. Consequently, the signal transmitter 200 can generate the output signal OS without the second harmonic signals DVS1' and DVS2', and can reduce noise without additional filters.

Figure 5:
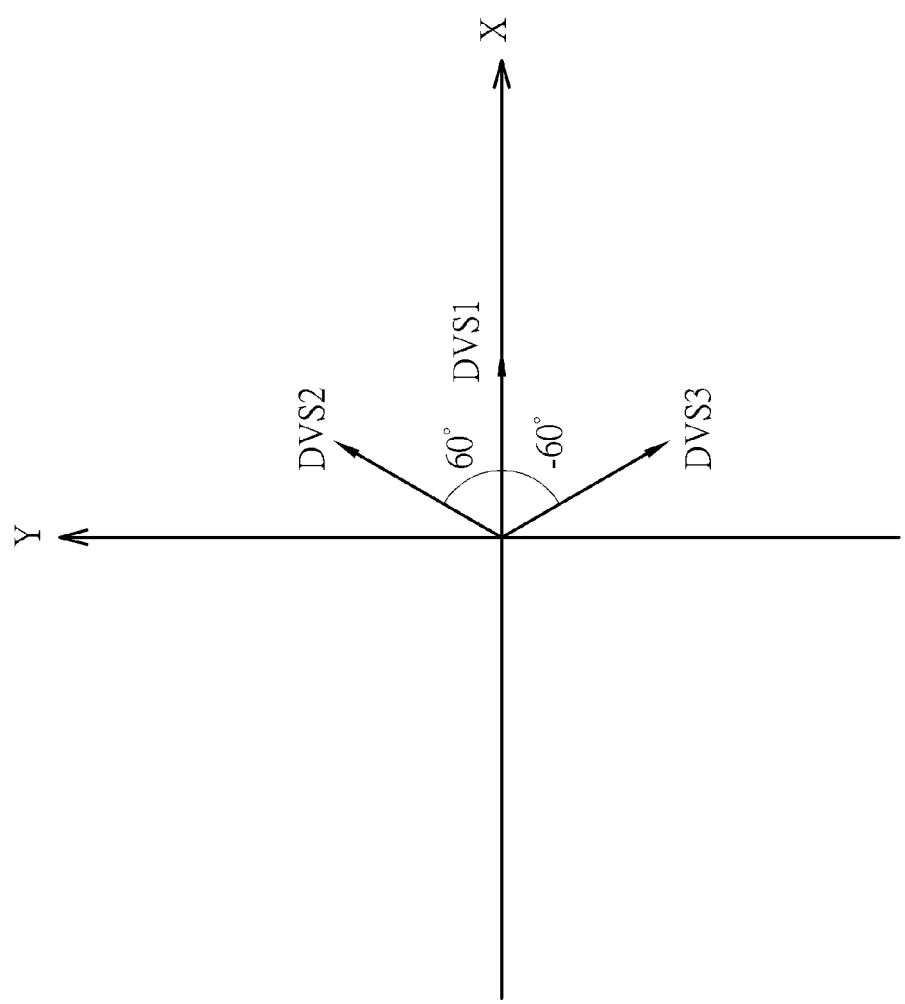
FIG. 5 shows separated signals according to another embodiment of the present invention.
Figure 6:
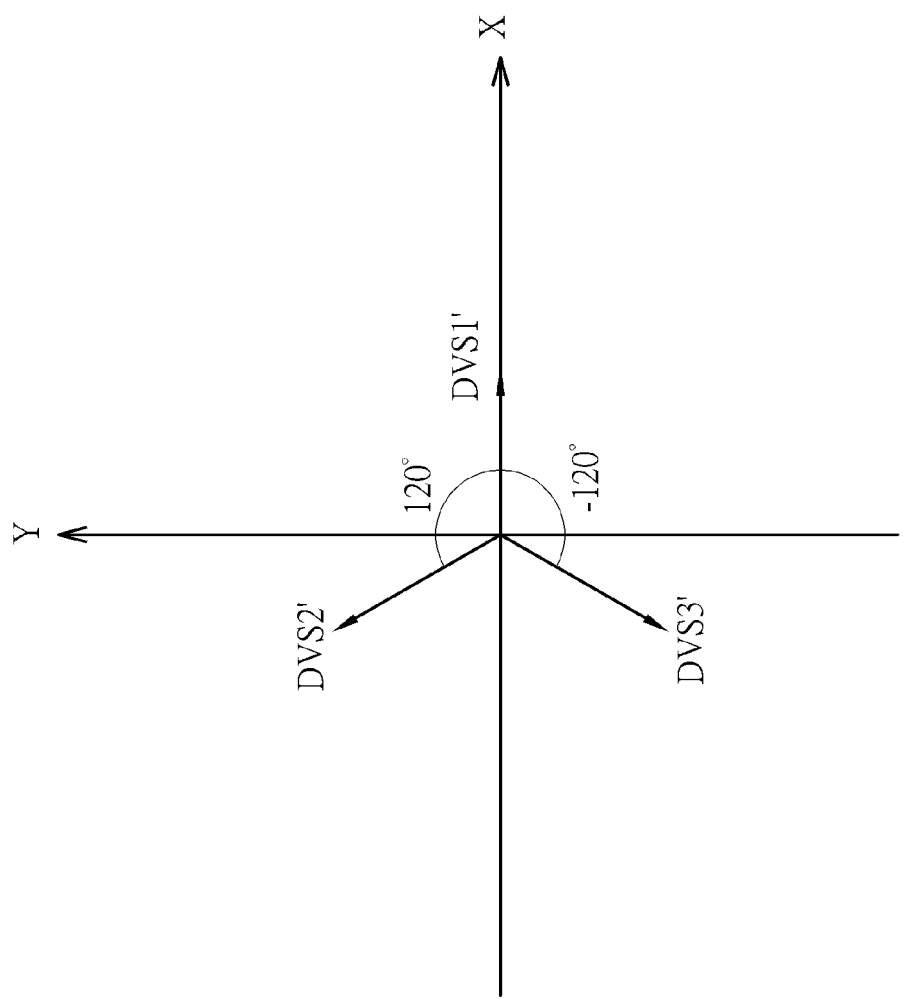
FIG. 6 shows second harmonic signals of the separated signals of FIG. 5.

In addition, the signal separation circuit 230 can generate even more separated signals and can eliminate the second harmonic signals, the third harmonic signals, and/or higher order harmonic signals in its various operations. FIG. 5 shows the separated signals DVS1, DVS2, and DVS3 according to one embodiment of the present invention. FIG. 6 shows the second harmonic signals DVS1', DVS2', and DVS3' of the separated signals DVS1, DVS2 and DVS3 in FIG. 5. In FIG. 5, the phase angles of the separated signals DVS1, DVS2, and DVS3 generated by the signal separation circuit 230 are 0 degree, 60 degrees and −60 degrees respectively. In FIG. 6, the phase angle of the second harmonic signal DVS1' of the separated signal DVS1 is 0 degree, the phase angle of the second harmonic signal DVS2' of the separated signal DVS2 is doubled to be 120 degrees, and the phase angle of the second harmonic signal DVS3' of the separated signal DVS3 is doubled to be −120 degrees. In this case, if the signal combining circuit 240 can combine the separated signal DVS1, DVS2, and DVS3 with same weightings, then the amplitudes of the second harmonic signals DVS1', DVS2' and DVS3' of the separated signals DVS1, DVS2 and DVS3 would be the same and the vectors of the second harmonic signals DVS1', DVS2' and DVS3' in FIG. 6 would cancel one another. Therefore, the output signal OS will include the separated signals DVS1, DVS2, and DVS3 in FIG. 5 but will not include the second harmonic signals DVS1', DVS2' and DVS3' of the separated signals DVS1, DVS2 and DVS3. Consequently, the signal transmitter 200 can generate the output signal OS without the second harmonic signals DVS1', DVS2' and DVS3', and can reduce noise without additional filters.

Figure 7:
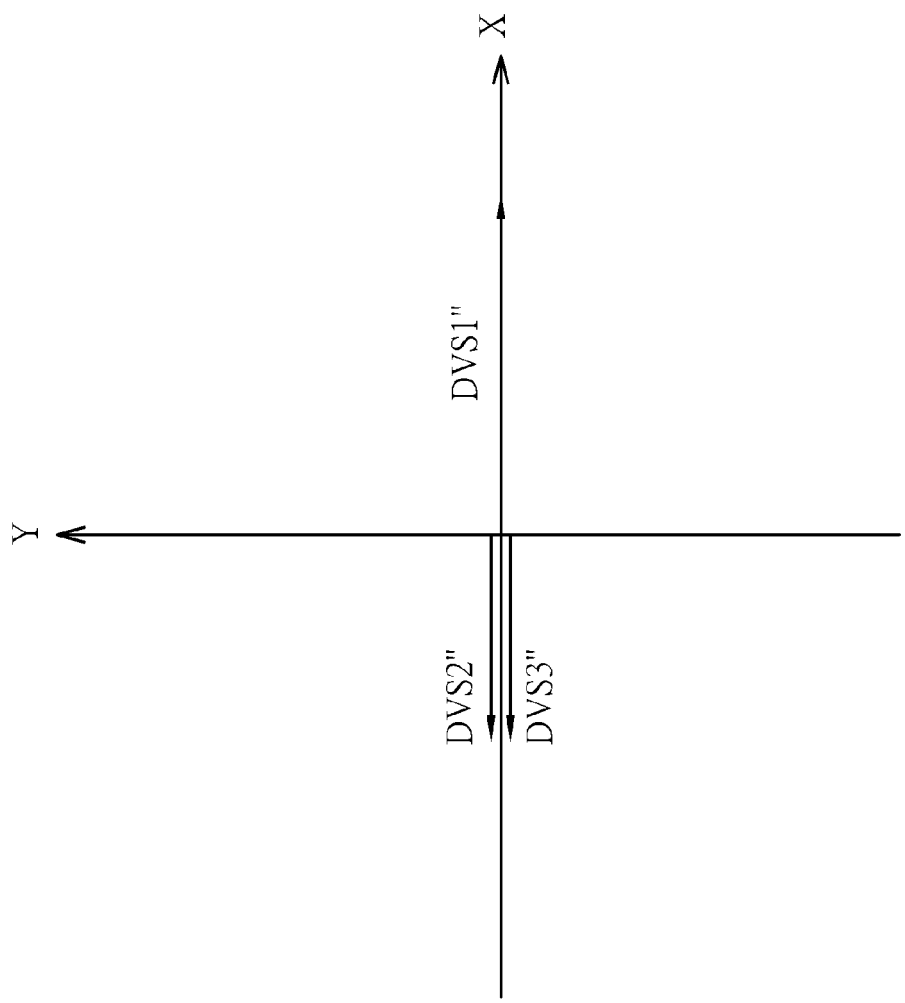
FIG. 7 shows third harmonic signals of the separated signals of FIG. 5.

FIG. 7 shows the third harmonic signals DVS1", DVS2", and DVS3" of the separated signals DVS1, DVS2 and DVS3 in FIG. 5. In FIG. 7, the phase angle of the third harmonic signal DVS1" of the separated signal DVS1 is 0 degrees, and the phase angle of the third harmonic signal DVS2" of the separated signal DVS2 is three times the phase angle of the separated signal DVS2, that is 180 degrees. Also, the phase angle of the second harmonic signal DVS3" of the separated signal DVS3 is three times the phase angle of the separated signal DVS3, that is −180 degrees. In this case, if the signal combining circuit 240 can combine the separated signal DVS1, DVS2 and DVS3 with the weighting of the first separated signal DVS1 being two times the weighting of the second separated signal DVS2 and the weighting of the first separated signal DVS1 being two times the weighting of the third separated signal DVS3, then the amplitudes and the phases of the third harmonic signals DVS2" and DVS3" of the separated signals DVS2 and DVS3 would be the same. Also, the sum of these two third harmonic signals DVS2" and DVS3" would cancel the third harmonic signal DVS1" of the separated signal DVS1. Therefore, the output signal OS will preserve the separated signals DVS1, DVS2 and DVS3 in FIG. 5 but will not include the third harmonic signals DVS1", DVS2" and DVS3" of the separated signal DVS1, DVS2 and DVS3. Consequently, the signal transmitter 200 can generate the output signal OS without the third harmonic signals DVS1", DVS2" and DVS3", and can reduce noise without additional filters.

Figure 8:
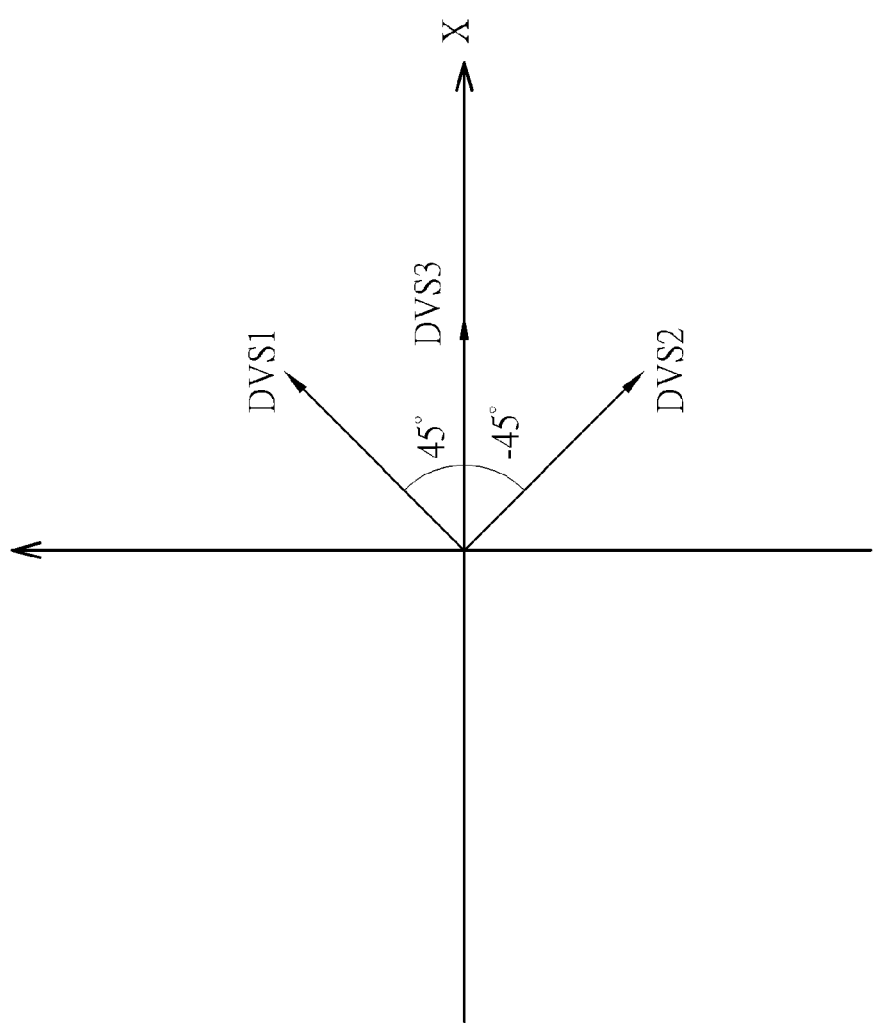
FIG. 8 shows separated signals according to another embodiment of the present invention.
Figure 9:
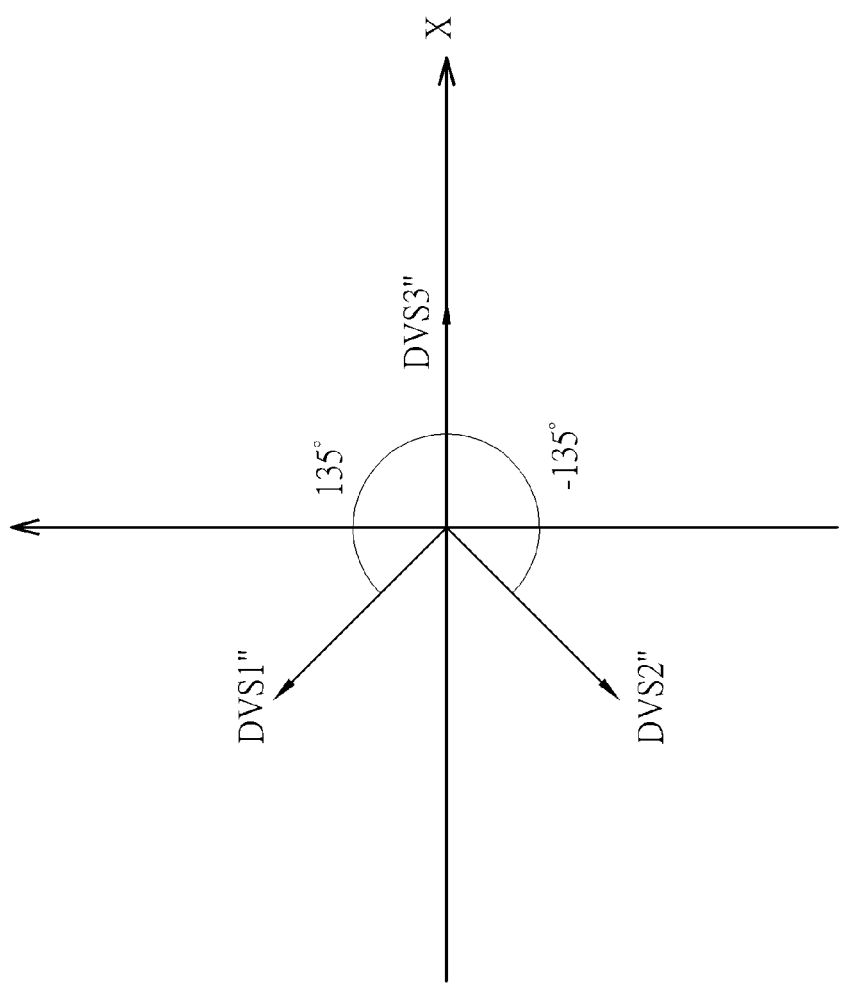
FIG. 9 shows third harmonic signals of the separated signals of FIG. 8.

FIG. 8 shows the separated signals DVS1, DVS2, and DVS3 according to one embodiment of the present invention. FIG. 9 shows the third harmonic signals DVS1", DVS2", and DVS3" of the separated signals DVS1, DVS2 and DVS3 in FIG. 8. In FIG. 8, the phase angles of the separated signals DVS1, DVS2, and DVS3 generated by the signal separation circuit 230 are 45 degrees, −45 degrees and 0 degree respectively. In FIG. 9, the phase angle of the third harmonic signal DVS1" of the separated signal DVS1 is three times the phase angle of the separated signal DVS1, that is 135 degrees. The phase angle of the third harmonic signal DVS2" of the separated signal DVS2 is three times the phase angle of the separated signal DVS2, that is −135 degrees. Also, the phase angle of the third harmonic signal DVS3" of the separated signal DVS3 is still 0 degrees. In this case, if the signal combining circuit 240 can combine the separated signal DVS1, DVS2 and DVS3 with the weighting of the third separated signal DVS3 being $\sqrt{2}$ times the weighting of the first separated signal DVS1 and the weighting of the third separated signal DVS3 being $\sqrt{2}$ times the weighting of the second separated signal DVS2, then the third harmonic signals DVS3" of the separated signal DVS3 and the sum of the third harmonic signals DVS1" and DVS2" of the separated signals DVS1 and DVS2 would have the same amplitude but opposite phases so the third harmonic signals of the three separated signals would cancel one another. Therefore, the output signal OS will include the separated signals DVS1, DVS2 and DVS3 in FIG. 8 but will not include the third harmonic signals DVS1", DVS2" and DVS3" of the separated signals DVS1, DVS2, and DVS3. Consequently, the signal transmitter 200 can generate the output signal OS without the third harmonic signals DVS1", DVS2" and DVS3", and can reduce noise without additional filters.

In other words, in the aforesaid embodiments, phase differences between different pairs of adjacent separated signals of the N separated signals DVS1 to DVSN are substantially equal, and the signal combining circuit 240 can combine the N separated signals DVS1 to DVSN with N corresponding weightings to eliminate $M^{th}$ harmonic signals of the N separated signals so as to generate the output signal OS, where M is a positive integer greater than 1. In addition, in some embodiments, the signal separation circuit 230 can also be implemented by a frequency mixer rather than a frequency divider. The frequency mixer can be coupled to the modulation circuit 110, and can manipulate the modulated signal MDS to generate the N separated signals DVS1 to DVSN.

Figure 10:
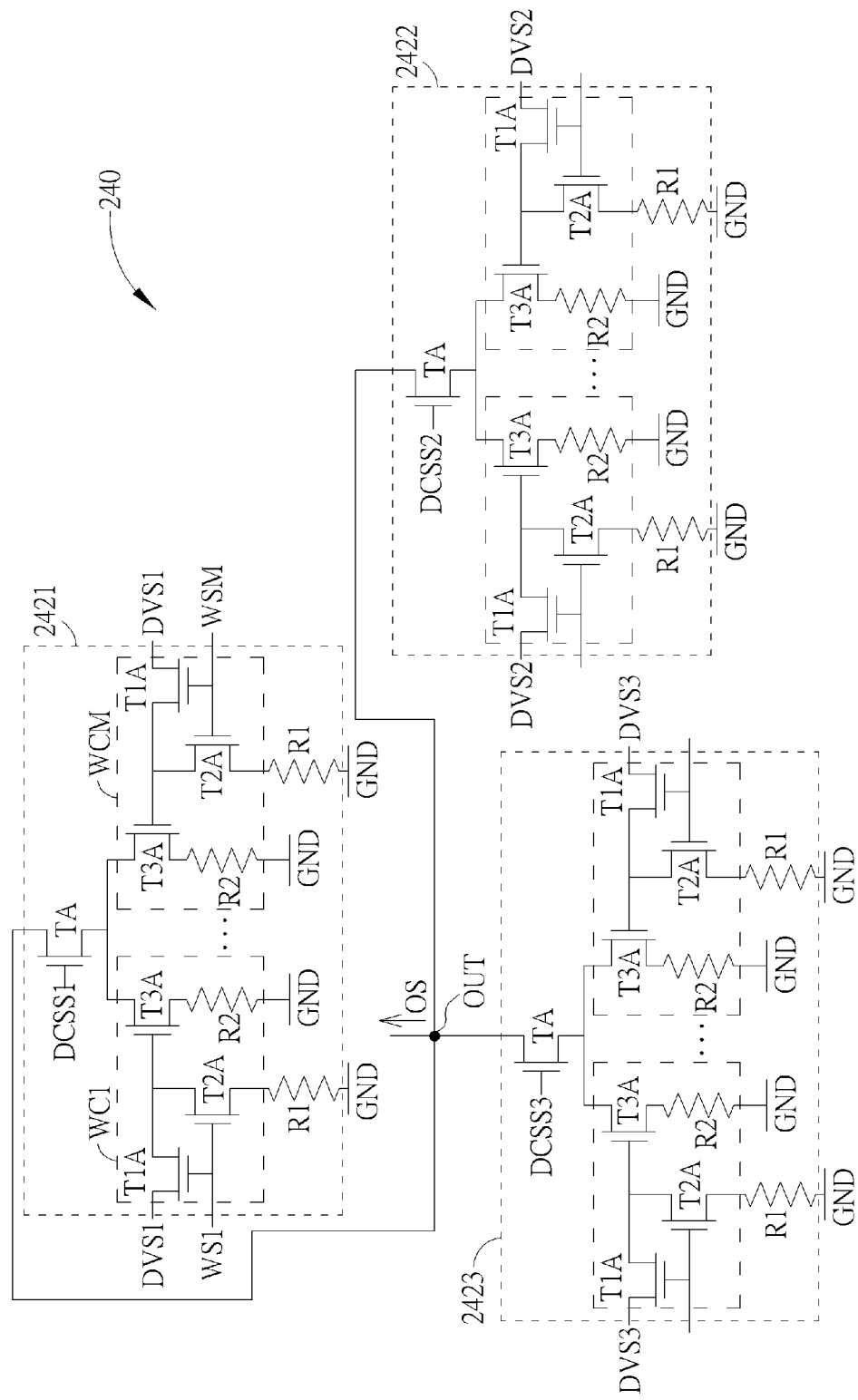
FIG. 10 shows a signal combining circuit according to one embodiment of the present invention.

In some embodiments of the present invention, the signal combining circuit 240 can include an output terminal OUT and N weighting control circuits. The output terminal OUT can output the output signal OS. FIG. 10 shows the signal combining circuit 240 according to one embodiment of the present invention. In FIG. 10, the signal combining circuit 240 includes three weighting control circuits 2421, 2422, and 2423, that is, N is 3.

The weighting control circuits 2421, 2422, and 2423 have the same structures, but can receive different separation signals DVS1, DVS2, and DVS3. For example, the weighting control circuit 2421 includes a control switch TA and M weighting circuits WC1 to WCM, where M is a positive integer. The control switch TA has a first terminal, a second terminal, and a third terminal. The first terminal of the control switch TA is coupled to the output terminal OUT, and the control terminal of the control switch TA can receive a selection signal DCSS1. When the selection signal DSCC1 is at a high voltage, the control switch TA can be turned on and the signal combining circuit 240 will add the corresponding separated signal DVS1 to the output signal OS. Similarly, the signal transmitter 200 can also control the signal combining circuit 240 to add the corresponding separated signals DVS2 and DVS3 to generate the output signal OS according to the selection signals DCSS2 and DCSS3. Therefore, the signal combining circuit 240 can select the required separated signals for combination.

Each of the weighting circuit WC1 to WCM of the weighting control circuits 2421 includes a first switch T1A, a second switch T2A, and a third switch T3A. The first switch T1A has a first terminal, a second terminal, and a control terminal. The first terminal of the first switch T1A can receive the separated signal DVS1, and the control terminal of the first switch T1A can receive a weighting signal. In some embodiments, the control terminals of the first switches T1A of the weighting circuit WC1 to WCM may receive different weighting signals. For example, the control terminal of the first switch T1A of the weighting circuit WC1 may receive the weighting signal WS1, and the control terminal of the first switch T1A of the weighting circuit WCM may receive the weighting signal WSM. Consequently, the signal transmitter 200 can choose the wanted separated signals for combination according to the selection signals DCSS1, DCSS2, and DCSS3, and to control the weightings of the separated signals by the weighting signals WS1 to WSM.

The second switch T2A has a first terminal, a second terminal, and a control terminal. The first terminal of the second switch T2A is coupled to the second terminal of the first switch T1A, the control terminal of the second switch T2A is coupled to the control terminal of the first switch T1A, and the second terminal of the second switch T2A can be coupled to the ground terminal GND through a resistor R1. The third switch T3A has a first terminal, a second terminal, and a control terminal. The first terminal of the third switch T3A is coupled to the second terminal of the control switch TA, the second terminal of the third switch T3A can be coupled to the ground terminal GND through a resistor R2, and the control terminal of the third switch T3A is coupled to the second terminal of the first switch T1A.

If the signal separation circuit 230 outputs the separated signals DVS1, DVS2, and DVS3 as shown in FIG. 8, the signal transmitter 200 can have the three selection signals DCSS1, DCSS2, and DCSS3 be at the high voltage. In this case, the signal combining circuit 240 can combine the three separated signals DVS1, DVS2, and DVS3 and can control the weightings of each separated signal by selecting the suitable resistors R2 and/or by turning on the required number of current paths by controlling the weighting control circuits 2421, 2422, and 2423 with the weighting signals. Therefore, when the weighting of the separated signal DVS3 is $\sqrt{2}$ times the weighting of the separated signal DVS1 and the weighting of the separated signal DVS3 is $\sqrt{2}$ times the weighting of the separated signal DVS2, the third harmonic signals DVS1", DVS2", and DVS3" of the separated signals DVS1, DVS2, and DVS3 can be canceled as shown in FIG. 9.

In the aforesaid embodiment, the signal transmitter 200 can have the selection signal DCSS3 be at the low voltage, and have the selection signals DCSS1 and DCSS2 be at the high voltage so the signal transmitter 200 can choose to only combine the separated signals DVS1 and DVS2 as the embodiment of FIG. 3. In this case, the signal transmitter 200 can make the weighting of the separated signals DVS1 equal to the weighting of the separated signal DVS2 by turning on the required number of current paths in the weighting circuits 2421 and 2422 according to the weighting signals WS1 to WSM. Consequently, the second harmonic signals DVS1' and DVS2' of the separated signals DVS1 and DVS2 can be eliminated.

In other words, the signal transmitter 200 can combine the required separated signals to eliminate the second harmonic signal, the third harmonic signal or higher order harmonic signals of the output signal OS for reducing the noise.

Figure 11:
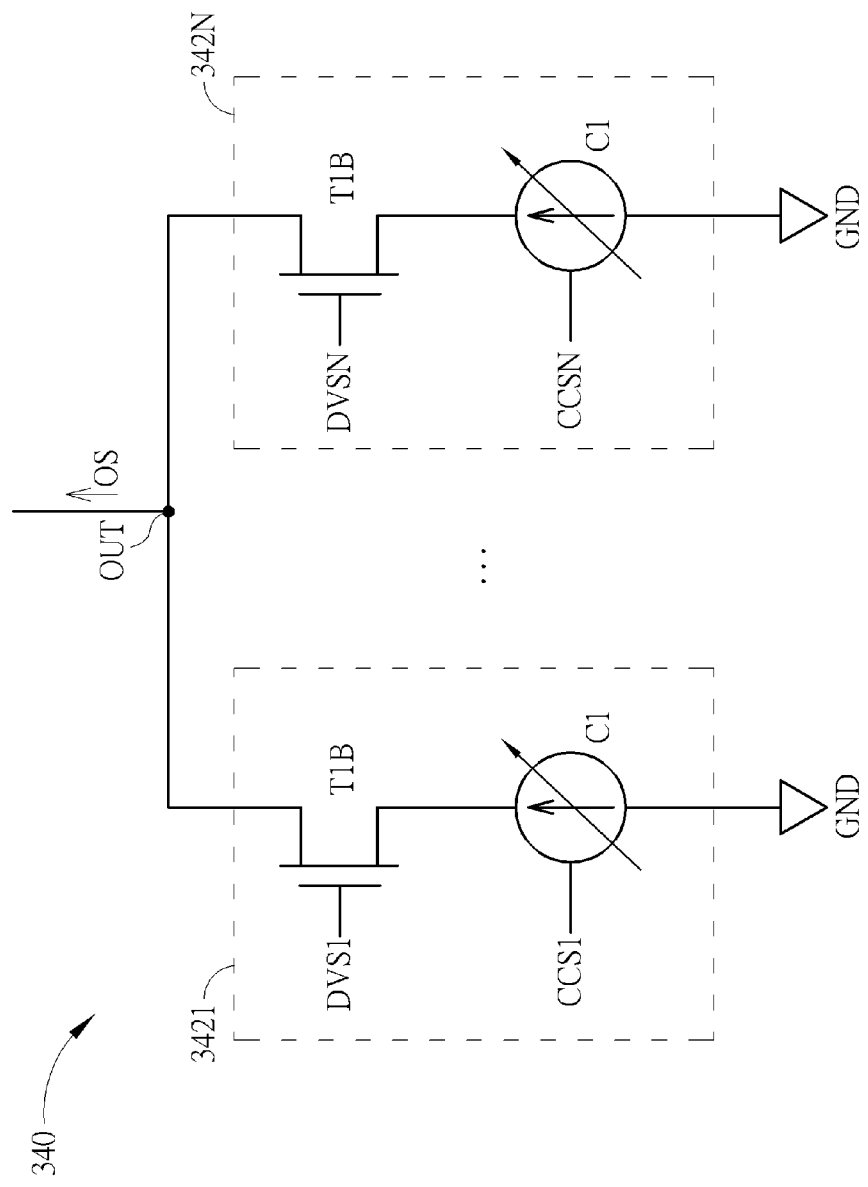
FIG. 11 shows a signal combining circuit according to another embodiment of the present invention.

FIG. 11 shows a signal combining circuit 340 according to one embodiment of the present invention. In some embodiments, the signal transmitter 200 may use the signal combining circuit 340 to replace the signal combining circuit 240. The signal combining circuit 340 includes N weighting control circuits 3421 to 342N. Each weighting control circuit 3421 to 342N includes a first switch T1B and a current source C1.

The first switch T1B has a first terminal, a second terminal, and a control terminal. The first terminals of the first switches T1B of the weighting control circuits 3421 to 342N are coupled to the output terminal OUT for outputting the output signal OS. The control terminals of the first switches T1B of the weighting control circuits 3421 to 342N can receive corresponding separated signals DVS1 to DVSN respectively. That is, the control terminal of the first switch T1B of the weighting control circuit 3421 can receive the separated signal DVS1, and the control terminal of the first switch T1B of the weighting control circuit 342N can receive the separated signal DVSN. The second terminals of the first switches T1B of the weighting control circuits 3421 to 342N can be coupled to the corresponding current sources C1 respectively, and the current sources C1 of the weighting control circuit 3421 to 342N can be controlled by the current control signals CCS1 to CCSN respectively.

In the present embodiment, the current control signals CCS1 to CCSN can be used to control the phases and the intensities of the currents generated by the current sources C1 so the signal transmitter 200 can adjust the amplitudes and phases of the separated signals DVS1 to DVSN by adjusting the phases and frequencies of the current control signals CCS1 to CCSN so as to eliminate undesirable harmonic signals and noise by combining the separated signals DVS1 to DVSN according to the system requirement. In some embodiments, the current source C1 and the first switch T1B can be coupled to the output terminal OUT in series. For example, in FIG. 11, the output terminal OUT is coupled to the ground terminal GND through the first switch T1B and the current source C1, however, in some embodiments, the coupling order between the first switch T1B and the current source C1 can also be altered.

Figure 12:
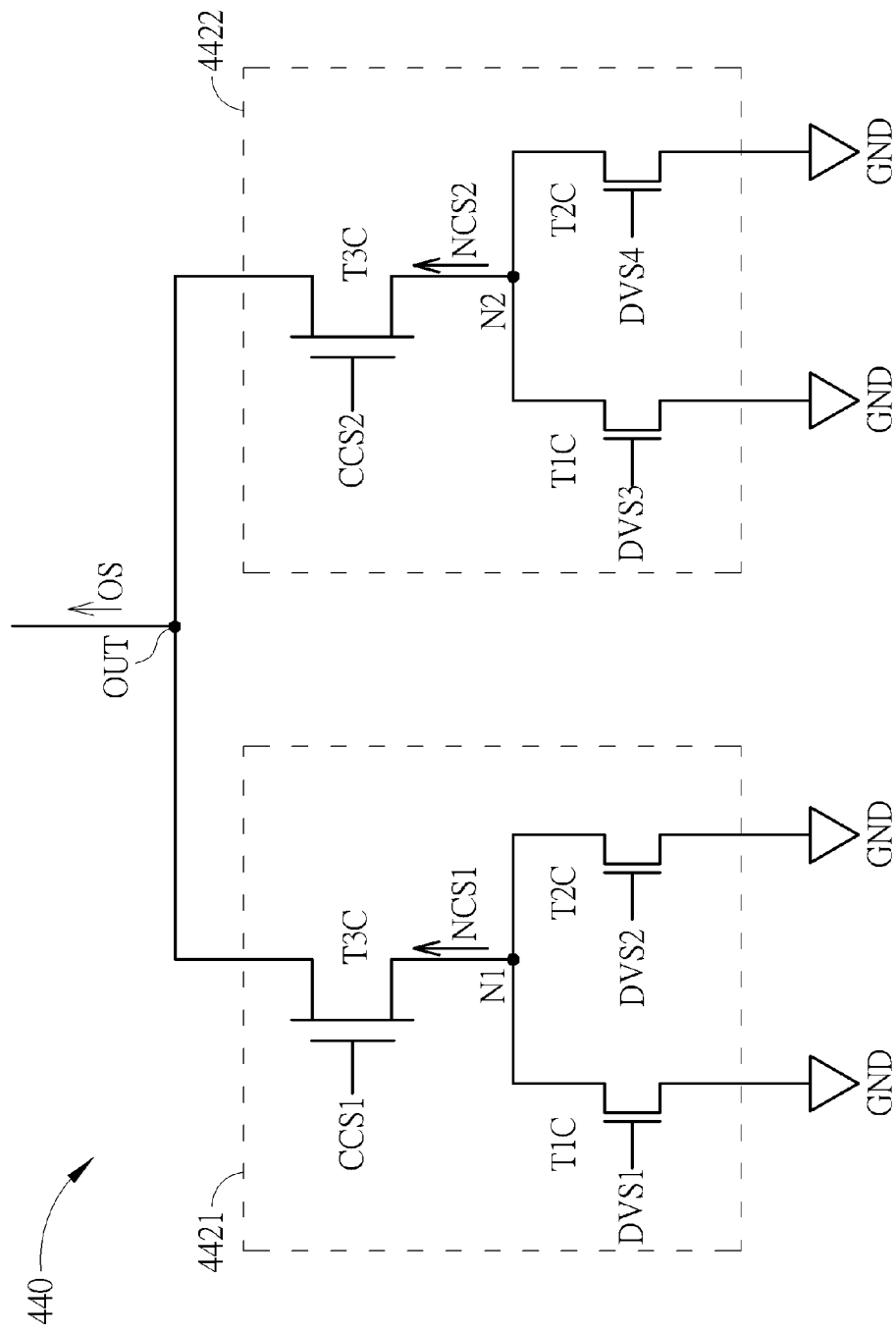
FIG. 12 shows a signal combining circuit according to another embodiment of the present invention.
Figure 13:
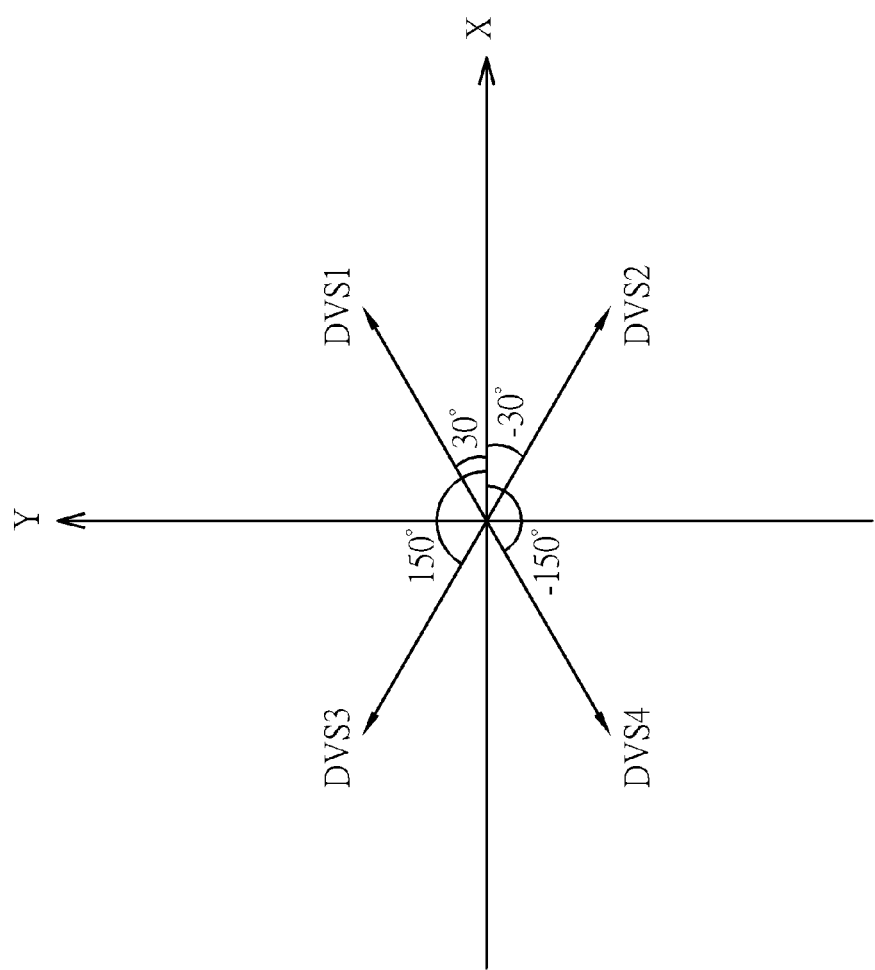
FIG. 13 shows separated signals according to another embodiment of the present invention.

In addition, in some embodiments, the signal transmitter may eliminate the second harmonic signal and the third harmonic signal of the output signal at once. FIG. 12 shows a signal combining circuit 440 according to one embodiment of the present invention. FIG. 13 shows the separated signals DVS1 to DVS4 in FIG. 12. In the embodiments of FIG. 13, the separated signals DVS1 and DVS4 are represented by vectors. Lengths of the vectors represent the amplitudes of the signals, and angles between the vectors and the X-axis represent the phases of the signals. In FIG. 13, lengths of the vectors of the separated signals DVS1 to DVS4 are the same. The phase angle of the separated signal DVS1 is 30 degrees, the phase angle of the separated signal DVS2 is −30 degrees, the phase angle of the separated signal DVS3 is 150 degrees, and the phase angle of the separated signal DVS4 is −150 degrees.

In some embodiments, the signal separation circuit 230 can generate the separated signals DVS1 to DVS4 as shown in FIG. 13. In this case, the signal transmitter 200 can use the signal combining circuit 440 to replace the signal combining circuit 240, and the signal combining circuit 440 can combine the separated signals DVS1 to DVS4 to eliminate the second harmonic signals and the third harmonic signals of the separated signals DVS1 to DVS4.

The signal combining circuit 440 includes two weighting control circuits 4421 and 4422 with the same structures; however, the weighting control circuit 4421 receives the separated signals DVS1 and DVS2 while the weighting control circuit 4422 receives the separated signals DVS3 and DVS4. Each weighting control circuit 4421 and 4422 includes a first switch T1C, a second switch T2C, and a third switch T3C.

For example, in the weighting control circuit 4421, the first terminals of the first switch T1C and the second switch T2C are coupled to the internal node N1, the control terminals of the first switch T1C and the second switch T2C can receive the corresponding separated signals DVS1 and DVS2 respectively, and the second terminals of the first switch T1C and the second switch T2C can be coupled to the ground terminal GND. After the signals generated by the first switch T1C and the second switch T2C of the weighting control circuit 4421 are combined at the internal node N1, a combined signal NCS1 is generated. The first terminal of the third switch T3C of the weighting control circuit 4421 can be coupled to the output terminal OUT, the second terminal of the third switch T3C of the weighting control circuit 4421 can be coupled to the internal node N1, and the control terminal of the third switch T3C of the weighting control circuit 4421 can receive the current control signal CCS1.

The relations between the internal node N2, the separated signals DVS3 and DVS4, the combined signal NCS2, and the current control signal CCS2 in the weighting control circuit 4422 can be referred to the weighting control circuit 4421 and will not be reiterated here.

In the present embodiment, the current control signal CCS1 can keep the combined signal NCS1 with the original phase, and the current control signal CCS2 can shift the phase of the combined signal NCS2 by 180 degrees. Consequently, when the combined signals NCS1 and NCS2 are further combined at the output terminal OUT, the output OS without the second harmonic signals and the third harmonic signals of the separated signals DVS1 to DVS4 can be generated.

Figure 14:
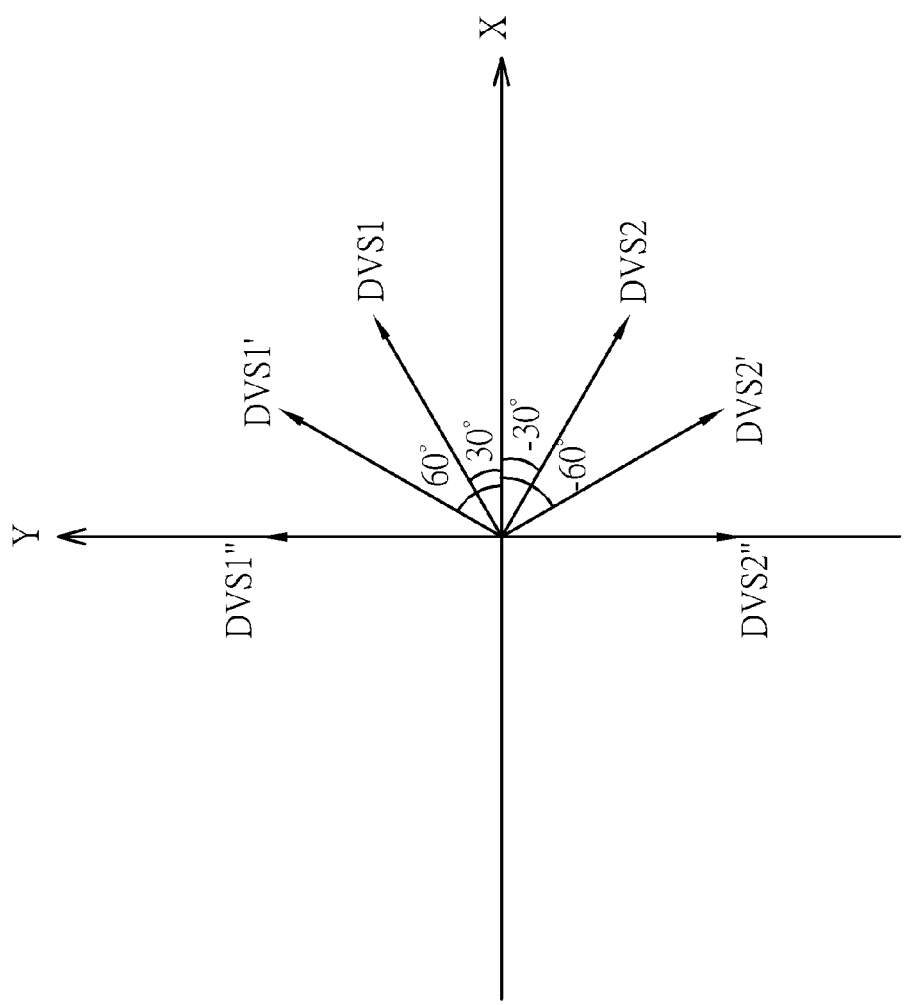
FIG. 14 shows second harmonic signals and third harmonic signals of part of the separated signals of FIG. 13.
Figure 15:
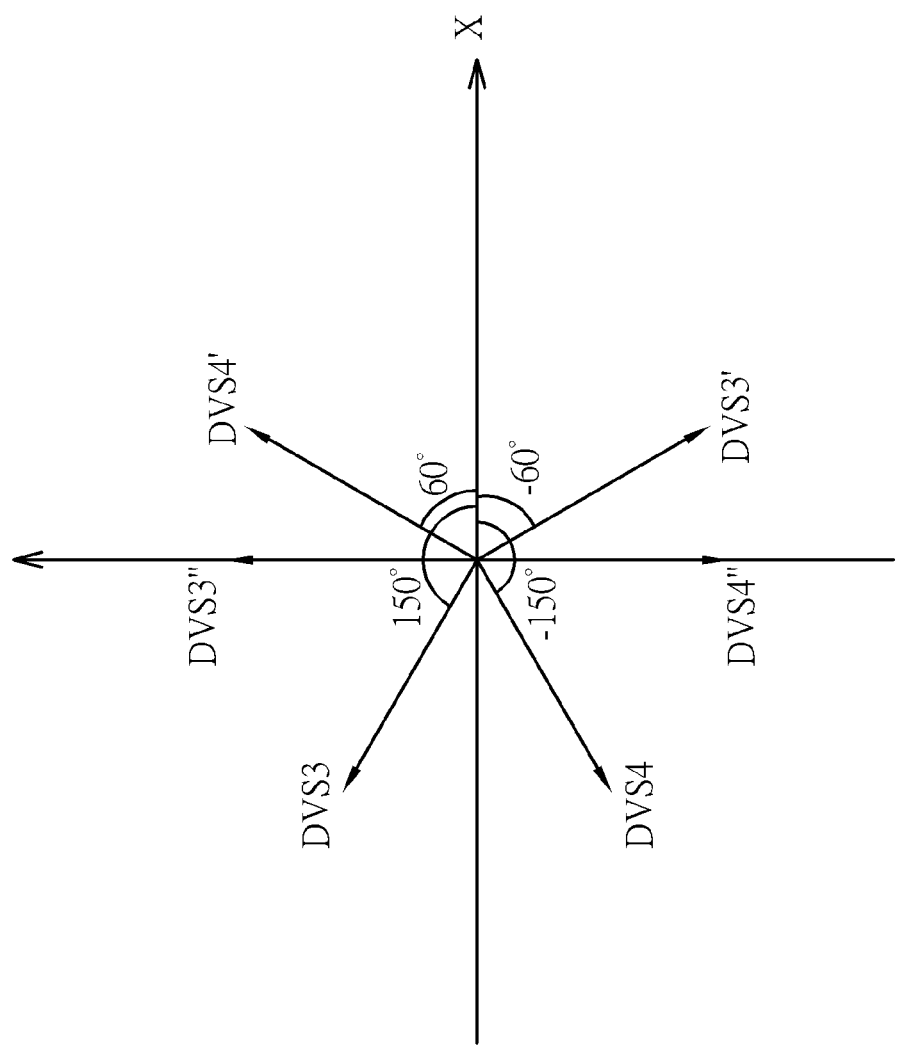
FIG. 15 shows second harmonic signals and third harmonic signals of part of the separated signals of FIG. 13.

FIG. 14 shows the separated signals DVS1 and DVS2, the second harmonic signals DVS1' and DVS2' of the separated signals DVS1 and DVS2, and the third harmonic signals DVS1" and DVS2" of the separated signals DVS1 and DVS2. FIG. 15 shows the separated signals DVS3 and DVS4, the second harmonic signals DVS3' and DVS4' of the separated signals DVS3 and DVS4, and the third harmonic signals DVS3" and DVS4" of the separated signals DVS3 and DVS4. In FIG. 14, the resultant vector of the third harmonic signals DVS1" and DVS2" of the separated signals DVS1 and DVS2 is 0, so the third harmonic signals DVS1" and DVS2" will cancel each other. Since the combined signal NCS1 is generated by the combination of the separated signal DVS1 and DVS2, the combination signal NCS1 will not include the third harmonic signals DVS1" and DVS2" of the separated signals DVS1 and DVS2. Similarly, in FIG. 15, the resultant vector of the third harmonic signals DVS3" and DVS4" of the separated signals DVS3 and DVS4 is 0, so the third harmonic signals DVS3" and DVS4" will cancel each other. Since the combined signal NCS2 is generated by the combination of the separated signal DVS3 and DVS4, the combination signal NCS2 will not include the third harmonic signals DVS3" and DVS4" of the separated signals DVS3 and DVS4.

In addition, according to the separated signals and the second harmonic signals shown in FIGS. 14 and 15, in the output signal OS outputted from the output terminal OUT, after the phase of the second harmonic signal of the combined signal NCS2 is shifted by 180 degrees (that is, after the phases of the second harmonic signals DVS3' and DVS4' shown in FIG. 15 are each shifted by 180 degrees), the second harmonic signal of the combined signal NCS2 and the second harmonic signal of the combined signal NCS1 (that is, the second harmonic signals DVS1' and DVS2' shown in FIG. 14) would cancel each other. Since the separated signals DVS3 and DVS4 with phases being shifted by 180 degrees are substantially equal to the separated signals DVS1 and DVS2, the output signal OS will include the separated signals DVS1 and DVS2, and the separated signals DVS3 and DVS4 with phases being shifted by 180 degrees but without their second harmonic signals and third harmonic signals. Consequently, the communications quality can be improved.

Although in FIG. 12, the signal combining circuit 440 includes two weighting control circuits 4421 and 4422, in some embodiments, the signal combining circuit 440 may also include other number of weighting control circuits, for example K weighting control circuits, according to the separated signals the signal transmitter 200 generates.

In summary, the signal transmitter provided by the embodiments of the present invention can cancel the unwanted harmonic signals without extra filters by synchronizing the clock signals of the phase lock loop and/or by adopting the frequency divider and the signal combining circuit. Therefore, the noise can be reduced effectively, and the circuit area of the filter required by the signal transmitter in prior art can be saved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal transmitter comprising:
   a modulation circuit configured to modulate a first signal to a modulated signal;
   a signal separation circuit coupled to the modulation circuit and configured to separate the modulated signal into N separated signals, wherein N is a positive integer greater than 1, and the N separated signals have different phases and a same frequency; and
   a signal combining circuit coupled to the signal separation circuit and configured to combine the N separated signals to eliminate at least one harmonic signal of the N separated signals so as to generate an output signal;
   wherein phase differences between different pairs of adjacent separated signals of the N separated signals are substantially equal.

2. The signal transmitter of claim 1, wherein the signal separation circuit comprises a frequency divider coupled to the modulation circuit and configured to divide a frequency of the modulated signal to generate the N separated signals.

3. The signal transmitter of claim 1, wherein:
   the N separated signals comprise a first separated signal, a second separated signal, and a third separated signal;
   a phase difference between the first separated signal and the second separated signal is 60 degrees, and a phase difference between the first separated signal and the third separated signal is −60 degrees; and
   the signal combining circuit combines the first separated signal, the second separated signal, and the third separated signal with same weightings to eliminate second harmonic signals of the first separated signal, the second separated signal, and the third separated signal so as to generate the output signal.

4. The signal transmitter of claim 1, wherein:
   the N separated signals comprise a first separated signal, a second separated signal, and a third separated signal;
   a phase difference between the first separated signal and the second separated signal is 60 degrees, and a phase difference between the first separated signal and the third separated signal is −60 degrees; and
   the signal combining circuit combines the first separated signal, the second separated signal, and the third separated signal with a weighting of the first separated signal being two times a weighting of the second separated signal and the weighting of the first separated signal being two times a weighting of the third separated signal to eliminate third harmonic signals of the first separated signal, the second separated signal, and the third separated signal so as to generate the output signal.

5. The signal transmitter of claim 1, wherein:
   the N separated signals comprise a first separated signal, a second separated signal, and a third separated signal;
   a phase difference between the third separated signal and the first separated signal is 45 degrees, and a phase difference between the third separated signal and the second separated signal is −45 degrees; and
   the signal combining circuit combines the first separated signal, the second separated signal, and the third separated signal with a weighting of the third separated signal being $\sqrt{2}$ times a weighting of the first separated signal and the weighting of the third separated signal being √2 times a weighting of the second separated signal to eliminate third harmonic signals of the first separated signal, the second separated signal, and the third separated signal so as to generate the output signal.

6. The signal transmitter of claim 1, wherein the signal combining circuit comprises:
an output terminal configured to output the output signal; and
N weighting control circuits, wherein an $n^{th}$ weighting control circuit comprises:
a control switch having a first terminal coupled to the output terminal, a second terminal, and a control terminal configured to receive a selection signal; and
a plurality of weighting circuits, each comprising:
a first switch having a first terminal configured to receive an $n^{th}$ separated signal of the N separated signals, a second terminal, and a control terminal configured to receive a weighting signal;
a second switch having a first terminal coupled to the second terminal of the first switch, a second terminal, and a control terminal coupled to the control terminal of the first switch; and
a third switch having a first terminal coupled to the second terminal of the control switch, a second terminal coupled to a ground terminal through a resistor, and a control terminal coupled to the second terminal of the first switch;
wherein n is a positive integer and n is smaller than or equal to N.

7. The signal transmitter of claim 1, wherein the signal combining circuit comprises:
an output terminal configured to output the output signal; and
N weighting control circuits, each comprising:
a current source configured to generate a current according to a current control signal; and
a first switch configured to be turned on according to a corresponding separated signal of the N separated signals;
wherein the current source and the first switch are coupled to the output terminal in series.

8. The signal transmitter of claim 1, wherein the signal combining circuit comprises:
an output terminal configured to output the output signal; and
K weighting control circuits, each comprising:
a first switch having a first terminal coupled to an internal node, a second terminal coupled to a ground terminal, and a control terminal configured to receive a first corresponding separated signal of the N separated signals;
a second switch having a first terminal coupled to the internal node, a second terminal coupled to a ground terminal, and a control terminal coupled to a second corresponding separated signal of the N separated signals; and
a third switch having a first terminal coupled to output terminal, a second terminal coupled to the internal node, and a control terminal configured to receive a current control signal;
wherein K is a positive integer.

9. The signal transmitter of claim 1, wherein:
the signal combining circuit is configured to combine the N separated signals with N corresponding weightings to eliminate $M^{th}$ harmonic signals of the N separated signals, M is a positive integer greater than 1.

10. The signal transmitter of claim 1, wherein the signal separation circuit comprises a frequency mixer coupled to the modulation circuit and configured to manipulate the modulated signal to generate the N separated signals.

11. The signal transmitter of claim 1, wherein the modulation circuit comprises a phase lock loop.

12. The signal transmitter of claim 1, wherein the modulation circuit comprises a frequency lock loop.

13. The signal transmitter of claim 1, wherein the output signal comprises first harmonic signals of the N separated signals.

14. A signal transmitter, comprising:
a modulation circuit configured to modulate a first signal to a modulated signal;
a signal separation circuit coupled to the modulation circuit and configured to separate the modulated signal into N separated signals, wherein N is a positive integer greater than 1, and the N separated signals have different phases;
a signal combining circuit coupled to the signal separation circuit and configured to combine the N separated signals to eliminate at least one harmonic signal of the N separated signals so as to generate an output signal; and
an analog to digital converter coupled to a phase lock loop of the modulation circuit and configured to convert an analog signal to the first signal with the first signal being a digital signal;
wherein the phase lock loop comprises a multi-modulus divider configured to generate a first clock signal required by the phase lock loop for modulating the first signal and generate a second clock signal required by the analog to digital converter.

15. The signal transmitter of claim 14, wherein the phase lock loop further comprises:
a mixture element configured to mix the first signal and a modulation reference signal to generate a second signal;
a sigma-delta modulator configured to modulate the second signal to a third signal;
a phase/frequency detector configured to output a comparing result according to a difference between a reference signal and an internal oscillation signal;
a charge pump configured to output a control voltage according to the comparing result;
a loop filter configured to filter high frequency noise of the control voltage; and
a voltage controlled oscillator configured to output the modulated signal according to the filtered control voltage;
wherein the multi-modulus divider is further configured to generate the internal oscillation signal according to the third signal and the modulated signal so as to feedback the internal oscillation signal to the phase/frequency detector and generate a third clock signal required by the sigma-delta modulator.

16. The signal transmitter of claim 14, wherein the phase lock loop further comprising:
a first mixture element coupled to the analog to digital converter and configured to mix the first signal and a digital control signal to update the first signal, wherein the modulation circuit is configured to modulate the first signal updated by the first mixture element.

17. The signal transmitter of claim 16, wherein the phase lock loop further comprises:

a second mixture element configured to mix the first signal updated by the first mixture element and a modulation reference signal to generate a second signal;

a sigma-delta modulator configured to modulate the second signal to a third signal;

a phase/frequency detector configured to output a comparing result according to a difference between a reference signal and an internal oscillation signal;

a charge pump configured to output a control voltage according to the comparing result;

a loop filter configured to filter high frequency noise of the control voltage; and a voltage controlled oscillator configured to output the modulated signal according to the filtered control voltage;

wherein the multi-modulus divider is further configured to generate the internal oscillation signal according to the third signal and the modulated signal so as to feedback the internal oscillation signal to the phase/frequency detector and generate a third clock signal required by the sigma-delta modulator.

18. A signal transmitter comprising:

a phase lock loop configured to generate a modulated signal at least according to a first signal; and an analog to digital converter coupled to the phase lock loop and configured to convert an analog signal to the first signal with the first signal being a digital signal;

wherein the phase lock loop comprises a multi-modulus divider, and the multi-modulus divider is configured to generate a first clock signal required by the phase lock loop for modulating the first signal, and second clock signal required by the analog to digital converter; and phases of the first clock signal and the second clock signal are synchronized.

19. The signal transmitter of claim 18, wherein the phase lock loop further comprises:

a first mixture element coupled to the analog to digital converter and configured to mix a digital control signal and the first signal to generate a mixed input signal;

wherein the phase lock loop generates the modulated signal according to the mixed input signal.

20. The signal transmitter of claim 18, wherein the phase lock loop further comprises:

a second mixture element configured to mix the first signal and a modulation reference signal to generate a second signal;

a sigma-delta modulator configured to modulate the second signal to a third signal;

a phase/frequency detector configured to output a comparing result according to a difference between a reference signal and an internal oscillation signal;

a charge pump configured to output a control voltage according to the comparing result;

a loop filter configured to filter high frequency noise of the control voltage; and a voltage controlled oscillator configured to output the modulated signal according to the filtered control voltage;

wherein the multi-modulus divider is further configured to generate the internal oscillation signal according to the third signal and the modulated signal so as to feedback the internal oscillation signal to the phase/frequency detector and generate a third clock signal required by the sigma-delta modulator.

21. A signal transmitter comprising:

a modulation circuit configured to modulate a first signal to a modulated signal;

a signal separation circuit coupled to the modulation circuit and configured to separate the modulated signal into N separated signals, wherein N is a positive integer greater than 1, and the N separated signals have different phases; and a signal combining circuit coupled to the signal separation circuit and configured to combine the N separated signals to eliminate at least one harmonic signal of the N separated signals so as to generate an output signal;

wherein:

the N separated signals comprise a first separated signal and a second separated signal;

a phase difference between the first separated signal and the second separated signal is 90 degrees; and the signal combining circuit combines the first separated signal and the second separated signal with same weightings to eliminate second harmonic signals of the first separated signal and the second separated signal so as to generate the output signal.

* * * * *